Aug. 28, 1956  R. L. JAESCHKE  2,760,611
CONTROL FOR DRIVE SYSTEMS
Filed March 18, 1953  2 Sheets-Sheet 1

FIG. I.

Ralph L. Jaeschke,
Inventor.
Koenig and Pope,
Attorneys.

Aug. 28, 1956    R. L. JAESCHKE    2,760,611
CONTROL FOR DRIVE SYSTEMS
Filed March 18, 1953    2 Sheets-Sheet 2

Ralph L. Jaeschke,
Inventor
Koenig and Pope,
Attorneys.

United States Patent Office 2,760,611
Patented Aug. 28, 1956

2,760,611

CONTROL FOR DRIVE SYSTEMS

Ralph L. Jaeschke, Kenosha, Wis., assignor, by mesne assignments, to Eaton Manufacturing Company, Cleveland, Ohio, a corporation of Ohio Application March 18, 1953, Serial No. 343,197

15 Claims. (Cl. 192—.098)

This invention relates to controls for drive systems, and more particularly to electromagnetic drive system controls.

Among the objects of this invention are generally the provision of simplified controls for drive systems, the provision of such controls adapted to control the output speed of a shaft driven by a prime mover in a forward and a reverse direction, both above and below idling speed; and the provision of controls of the class described in which operation of a single manually-operated lever can be used to vary the speed of a prime-mover-driven output shaft over any of a wide range of predetermined values. Other objects and features will be in part apparent and in part pointed out hereinafter.

Briefly, the invention comprises a control for a drive system including a driven shaft, a prime mover, a first electromagnetic clutch for driving said shaft in one direction, a second electromagnetic clutch for driving said shaft in a reverse direction, and a D. C. field coil for each of said clutches adapted to couple said prime mover to said driven shaft in response to electrical energization thereof. The control comprises current amplifier means for each of said coils adapted variably to energize its respective coil in response to a composite potential, and a circuit connected to said current amplifier means including a D. C. generator, a potentiometer having at least two positioning ranges and a constant D. C. potential source therefor. The generator is connected to said driven shaft and has a first D. C. output potential responsive in magnitude and polarity to rotational speed and direction respectively of the driven shaft. The potentiometer has a D. C. output potential responsive to the positioning thereof to produce a second D. C. potential in opposition to the first D. C. potential whereby in the first positioning range the first clutch is energized to drive the driven shaft in one direction and in the second positioning range the second clutch is energized to drive said shaft in a reverse direction.

The invention accordingly comprises the constructions hereinafter described, the scope of the invention being indicated in the following claims.

In the accompanying drawings, in which several of various possible embodiments of the invention are illustrated, Fig. 1 is a mechanical and electrical circuit diagram illustrating a control of the present invention associated with a drive system represented in skeleton form;

Corresponding reference characters indicate corresponding parts throughout the several views of the drawings.

Figure 1:
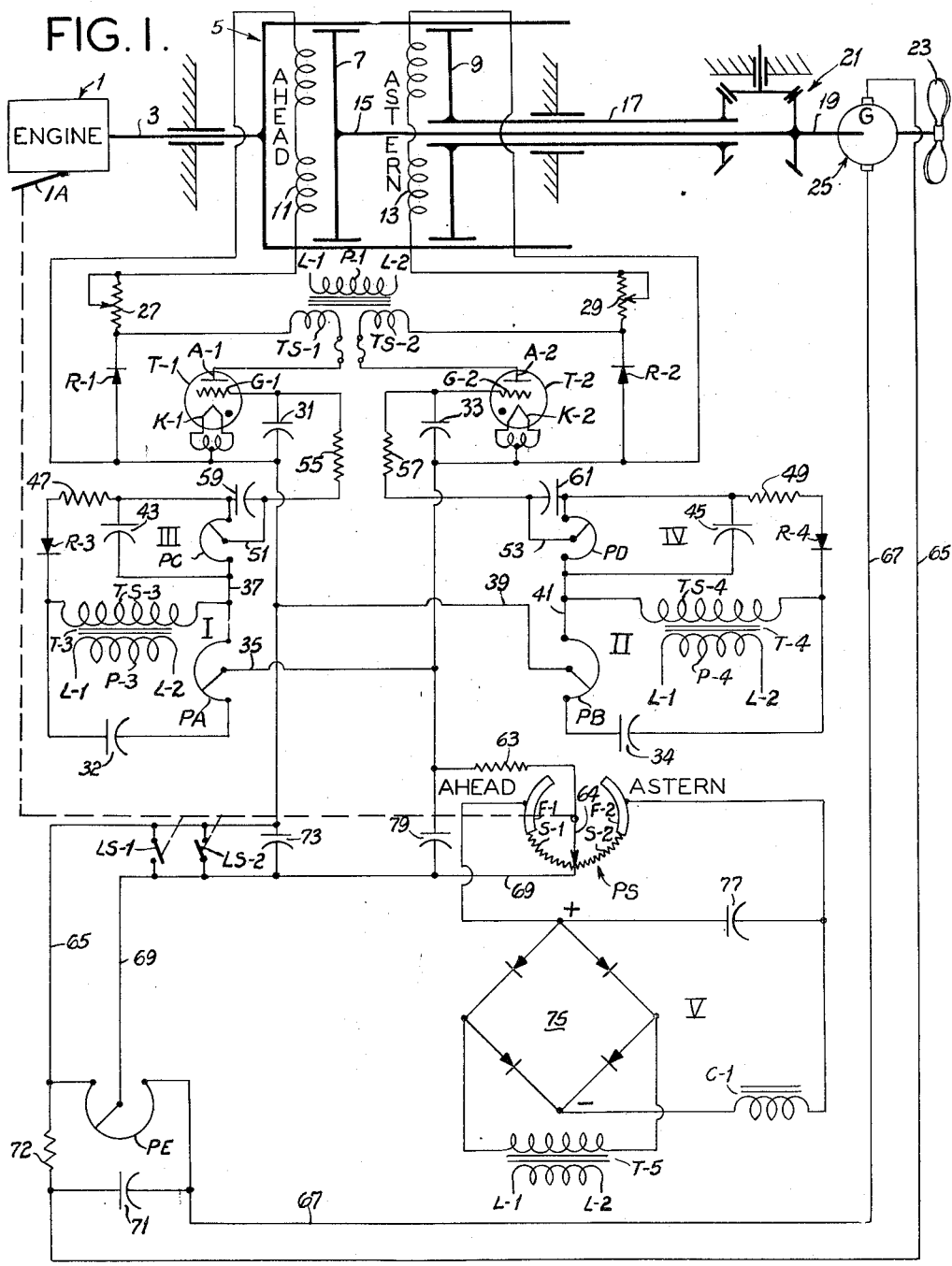

Referring now to Fig. 1, there is shown at numeral 1 a prime mover (engine) coupled through a driving shaft 3 to an inductor drum or member 5. A pair of field members 7 and 9 (having D. C. field coils 11 and 13, respectively) is mounted in magnetic relationship with inductor member 5, thus forming two electromagnetic eddy-current slip couplings having a common inductor. These slip couplings 7 and 9 (adapted separately to be driven from inductor drum 5 when the respective associated field coils 7 and 9 are electrically energized) are in turn each mechanically coupled to a driven shaft 19 through a second driving shaft 15 and a quill 17, respectively. A reverse gear train 21 is interposed between quill 17 and shaft 19. Driven shaft 19 is provided with a work load member 23, represented by a marine propeller. Also driven by shaft 19 is a D. C. generator 25 which is electrically connected to a control circuit as described in detail hereinafter. Generator 25 is preferably of the permanent-magnetic D. C. type but may be of any conventional D. C. type construction.

Field coil 11, also designated "Ahead," is variably energized by means of a circuit comprising a thyratron tube T–1, a transformer secondary TS–1, a back rectifier R–1 and a rheostat 27. Field coil 13, designated "Astern," is similarly variably energized through a second rectifier circuit including a thyratron T–2, a back rectifier R–2, a transformer secondary TS–2 and a rheostat 29. Transformer primary P–1, connected to a source of A. C. power L–1 and L–2, is associated with secondaries TS–1 and TS–2.

Back rectifiers R–1 and R–2 function to smooth out pulsations in the excitation current of field coils 11 and 13 and to provide an electrical path for the inductive discharge currents from these coils upon deenergization. Rheostats 27 and 29 provide adjustment of the field currents.

Each of the current amplifiers or thyratrons T–1 and T–2 has a grid (G–1 and G–2, respectively), a cathode (K–1 and K–2, respectively) and an anode (A–1 and A–2, respectively). The cathodes K–1 and K–2 are electrically energized from an A. C. source through customary filament transformers, the primaries of which are not shown.

The conductivity of the thyratron T–1 is controlled by a grid-cathode signal applied between G–1 and K–1. The conductivity of T–2 is similarly but independently controlled by the grid-cathode signal appearing across G–2, K–2. Condensers 31 and 33 are connected across these grid-cathode circuits, respectively, in order to by-pass A. C. transients induced by anode currents. These grid-cathode signals are composite potentials comprising at least two separate D. C. potentials and also preferably an A. C. rider wave.

The stated control signals for separately and variably energizing thyratrons T–1 and T–2 (and thereby varying the coupling of field members 7 and 9 to inductor drum 5) are provided by a control circuit including generator 25, a speed-control potentiometer PS, A. C. rider-wave units I and II, and slow-speed or balance units III and IV. Rider-wave units I and II comprise a secondary (TS–3 or TS–4, respectively) of a transformer (T–3 or T–4, respectively) series-connected with a condenser (32 or 34, respectively) and a potentiometer (PA or PB, respectively). Primaries P–3 and P–4 are connected to A. C. source L–1, L–2. The phase-shifted A. C. output of unit I is supplied by wire 35 (connected to the rotor of the sensitivity potentiometer PA) and wire 37. The phase-shifted A. C. output potential of unit II is supplied by wires 39 and 41.

The circuit components of units III and IV include a rectifier (R–3 or R–4, respectively), the transformer secondary (TS–3 or TS–4, respectively), a filter condenser (43 or 45, respectively), a resistor (47 or 49, respectively) and a potentiometer (PC or PD, respectively). The adjustable D. C. potential output of unit III is supplied by wires 37 and 51. Unit IV also similarly supplies an adjustable D. C. potential to wires 41 and 53. Wires 51 and 53 are connected to grids G–1 and G–2, respectively, through grid-blocking resistors 55 and 57. By-pass condensers 59 and 61 are provided for connections 51 and 53, respectively.

Thus, it can be seen that the adjustable phase-shifted A. C. output of unit I is series-connected with the adjustable D. C. output of unit III in a circuit (resistor 55, wires 51, 37 and 35) interconnecting G–1 and K–2.

Similarly, the adjustable D. C. output of unit IV and the adjustable phase-shifted A. C. output of unit II are series-connected in a circuit (resistor 57, wires 53, 41 and 39) interconnecting G–2 and K–1.

Wire 35 is also connected through a series resistor 63 to a rotor 64 of a speed-setting potentiometer PS, while wire 39 is also connected through a wire 65 to one terminal of generator 25. The other output terminal of generator 25 is connected through wire 67, the potentiometer PE and a wire 69 to a center tap of PS. A filter condenser 71, a resistor 72 and a by-pass condenser 73 are provided for this circuit of generator 25. Thus, it can be seen that the D. C. output potential of generator 25 (adjustable by potentiometer PE) and the D. C. output potential of PS (present between rotor 64 and PS center tap) are series-connected between wires 35 and 39.

Speed control potentiometer PS is supplied with a constant D. C. potential source V which comprises a bridge rectifier unit 75, a secondary of a transformer T–5, a filter choke C–1 and a filter condenser 77. The output terminals of the bridge rectifier, having polarities as indicated, are connected to the opposite ends of PS. A by-pass condenser 79 is connected between the rotor and the tap of potentiometer PS.

Figure 3:
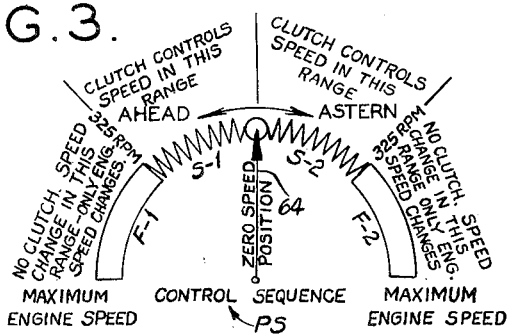
Fig. 3 is an enlarged view of a speed-control potentiometer unit illustrating the control sequence throughout various positioning ranges.

The construction of potentiometer PS is shown in greater detail in Fig. 3, which illustrates that there are generally two control sections, labeled "Ahead" and "Astern," one on either side of the potentiometer center tap, and that there are four positioning sectors or ranges S–1, S–2 and F–1 and F–2. The former two ranges provide a varying degree of resistance in the associated circuits depending upon the manual positioning of rotor 64, while the latter two ranges, F–1 and F–2, provide no change of resistance as the rotor sweeps them.

Two limit switches LS–1 and LS–2, connected across the output of the circuit of generator 25, are mechanically linked in any conventional desired fashion to the rotor of potentiometer PS so that the switch LS–1 will be closed only during the time the rotor is positioned in sector F–1, and LS–2 will be closed only when the rotor is traversing range F–2.

Rotor 64 is also linked mechanically to a throttle 1A of prime mover 1 through a suitable lost-motion connection (as indicated by the dashed line of Fig. 1) such that increased throttle opening from idling position does not occur until rotor 64 is advanced in either direction over sectors S–1 or S–2, i. e., until 64 reaches either of the ranges F–1 or F–2. Then, the further the rotor 64 is moved away from the center tap, when rotor 64 is in either the F–1 or F–2 ranges, the further the throttle is opened. Rotor 64 is manually operated by a single lever or handle. Lost-motion devices such as above referred to are known to those skilled in the linkage art and require no further description.

Operation is as follows:

With prime mover 1 operating at idling speed and rotor 64 centrally positioned, inductor drum 5 will rotate at idling speed. As field members 7 and 9 are not energized, shaft 15, quill 17, generator 25 and propeller 23 will not be actuated. Upon connecting L–1 and L–2 to an A. C. power source and moving rotor 64 clockwise into range S–1, a D. C. potential will be produced between rotor 64 and wire 69. As rotor 64 is connected (via a resistor 63, wire 35, potentiometer PA, wire 37, potentiometer PC, wire 51 and resistor 55) to G–1 and wire 69 is connected to K–1 (via wire 69, potentiometer PE, wire 67, generator 25 and wire 65) grid G–1 will be positive in relation to K–1, thyratron T–1 will conduct and current will flow through field coil 11. This will cause electromagnetic coupling between member 7 and drum 5, thus actuating shafts 15 and 19, generator 25 and propeller 23. A D. C. potential, which is a function of the speed of shaft 19, will be produced by generator 25 having a polarity opposing (wire 67 negative and wire 65 positive) that of the D. C. output potential of the potentiometer PS. When the output speed of shaft 19 increases to a point where these two D. C. potentials are in equilibrium, the output speed of shaft 19 will remain at the speed determined by the manual positioning of rotor 64. Any load variation will be reflected in a modified speed of shaft 19 and a changed D. C. potential output of generator 25, which in turn will cause increased conduction of T–1 to increase the coupling of member 7 with drum 5 and thereby increase the speed of shaft 19 to the set predetermined speed. Thus, it can be seen that for any setting of rotor 64 and sector S–1, shaft 19 will be actuated at a corresponding speed less than idling, and that the composite potential impressed across G–1, K–1 controls the degree of coupling between clutch members 5 and 7.

The amplitude of the phase-shifted A. C. rider wave produced by unit I is adjustable by potentiometer PA. Potentiometer PC of unit III provides an additional adjustable D. C. biasing potential increment for T–1.

When rotor 64 is manually moved from sector S–1 to F–1, limit switch LS–1 closes and the throttle of prime mover 1 is advanced. The closing of LS–1 eliminates the D. C. output potential of generator 25 and directly connects K–1 to wire 69 so that a high D. C. potential from potentiometer PS is impressed between K–1, G–1, the latter being of a positive polarity. Under these conditions, T–1 will conduct for a maximum period of time and cause maximum coupling between members 5 and 7. When rotor 64 is positioned in sector F–1, the speed of shaft 19 is a function only of the throttle setting, so that the shaft speed increases with the speed of engine 1 as rotor 64 is moved clockwise in positioning range F–1 (counterclockwise in Fig. 3).

When rotor 64 is moved from its central location over the center tap into range S–2, operation is similar to that described above in regard to operation in sector S–1. However, it will be noted that in this instance rotor 64 (connected to cathode K–2 through resistor 63) is of negative polarity relative to the center tap of potentiometer PS. In other words, the relative polarities of rotor 64 and wire 69 are reversed when rotor 64 is moved from sector S–1 to sector S–2. If shaft 19 is not turning, generator 25 will produce no opposing D. C. output potential and the relatively positive wire 69 is connected through wires 39 and units II and IV to G–2, thus causing thyratron T–2 to conduct and to couple member 9 to drum 5. Quill 17 and gear train 21 then will be actuated, thereby causing shaft 19 to turn propeller 23 in reverse direction. The polarity of the D. C. output potential of generator 25 when propeller 23 is turning in a reverse direction will also be reversed so that wire 65 is negative and wire 67 is positive. This potential opposes that of the potentiometer PS and controlled predetermined reverse speeds, below idling speed, are thus set by adjustment of rotor 64 within sector S–2. When rotor 64 is moved counterclockwise into range F–2, limit switch LS–2 is closed and the D. C. output potential of potentiometer PS, without the opposing potential of generator 25, is applied directly across the grid-cathode circuit of T–2 causing it to conduct for a maximum period. In sector F–2, the speed of shaft 19 in the reverse direction is controlled solely by the throttle setting, as there is optimum coupling between member 9 and drum 5 for the same reason as described above in regard to operation in sector F-1, except in this instance thyratron T-2 is the current amplifier involved.

Potentiometers PB and PD have the same function as described above for potentiometers PA and PC. Moreover, potentiometers PC and PD may be utilized to balance the conductions of T-1 and T-2, respectively, so that for any one "Ahead" speed setting in the S-1 range, the same "Astern" speed is obtained at a corresponding setting in the S-2 range. Rheostats 27 and 29 are also useful for controlling the respective "Ahead" and "Astern" speeds, particularly during operation when rotor 64 is positioned in the F-1 or F-2 ranges. Thus, the throttle 1A fully opened, the "Ahead" or "Astern" speeds may be controlled by positioning rheostats 27 and 29.

Figure 2:
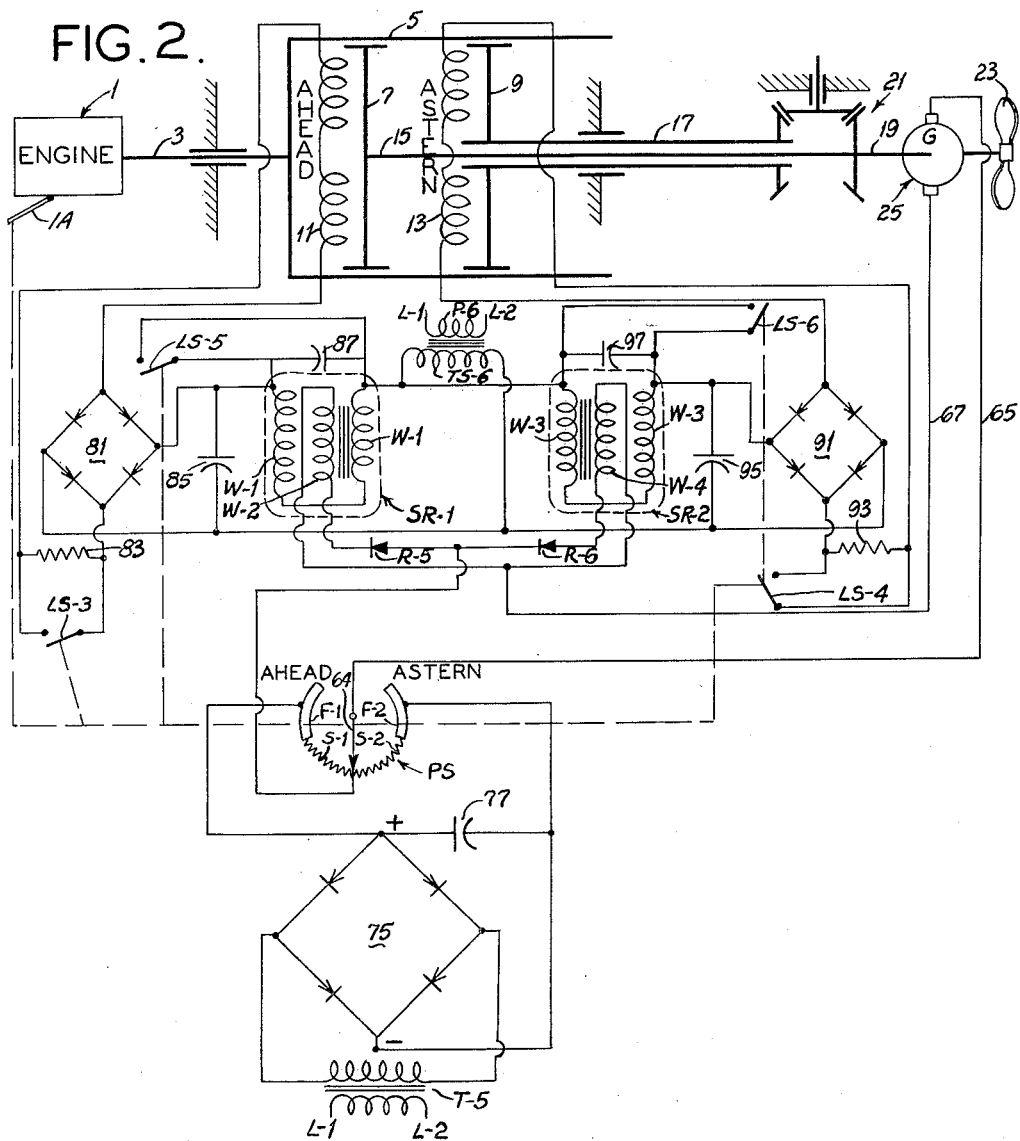
Fig. 2 is a circuit diagram of a second embodiment of the invention.

Referring now to Fig. 2, the field coil 11 is connected to a circuit comprising a current amplifier or saturable reactor SR-1 and a bridge rectifier unit 81. Saturable reactor SR-1 includes power windings W-1 and a control winding W-2. Windings W-1 and the input terminals of bridge 81 are series-connected with a transformer secondary TS-5. The output terminals of bridge 81 are series-connected with a resistor 83 and coil 11. A condenser 85 is connected across the input terminals of rectifier 81 and another condenser 87 is parallel-connected with power windings W-1. Transformer primary P-6 is connected to A. C. power source L-1, L-2.

The circuit for energizing the "Astern" field coil 13 consists of elements identical to those described in the preceding paragraph as the energizing circuit for coil 11. That is, saturable reactor SR-2, windings W-3 and W-4, rectifier 91, resistor 93 and condensers 95 and 97 correspond to their respective counterparts, SR-1, windings W-1 and W-2, rectifier 81, resistor 83, and condensers 85 and 87.

The control windings W-2 and W-4 are loop-connected in series with two similarly polarized rectifiers R-5 and R-6. A composite D. C. potential is applied between the junction of these rectifiers (connected to the center tap of potentiometer PS) and the opposite side of the loop (connected to wire 67). The variation of the composite D. C. potential produced by generator 25 and potentiometer PS varies the impedance of the power windings W-1 and W-3 so that the A. C. current carried thereby is a function of this potential. More detail on the saturable reactors or magnetic amplifiers may be found in my U. S. Patent 2,551,839.

The operation of the Fig. 2 control is generally similar to that of Fig. 1 and differs in only minor respects. In view of the fact that output impedance of the power windings W-1 and W-3 is controlled by varying the current flow through the respective control windings W-2 and W-4, no A. C. rider-wave units are necessary. The rectifiers R-5 and R-6 are so connected that when rotor 64 is in sectors S-1 or F-1 current will flow only through winding W-2, and, conversely, current will flow through winding W-4 only when the rotor is in positioning ranges S-2 and F-2.

Also in the case of Fig. 2, resistances 83 and 93, shunted by contacts LS-3 and LS-4, respectively, are employed, rather than utilizing rheostats 27 and 29 in series with field coils 11 and 13, respectively, as in Fig. 1. Power windings W-1 and W-3 are shunted by limit switches LS-5 and LS-6, which are linked to potentiometer PS in the same fashion that limit switches LS-1 and LS-2 are linked. LS-5 and LS-6 serve the same function as LS-1 and LS-2, i. e., applying sufficient field current to coils 11 and 13 (when rotor 64 is in ranges F-1 and F-2, respectively) to obtain optimum coupling between inductor drum 5 and members 7 and 9, respectively. In the Fig. 2 embodiment this is accomplished directly by shunting out the power windings W-1 and W-2. Contacts LS-3 and LS-4 are similarly closed only in F-1 and F-2 ranges, respectively, and avoid the possibility of excessive torque in the slip couplings during engine reversal.

It will be understood that conventional start-stop circuits can be associated with the controls of Figs. 1 and 2 and that the customary time-delay and fuse protectors may be associated with the Fig. 1 embodiment. Also, if desired, switching arrangements could be provided for these controls which could alternatively supply D. C. directly to the clutch coils 11 and 13. Moreover, devices indicating stalled shaft conditions, etc., could be associated with either of the above two embodiments.

Although the above controls are described in relation to marine drive systems, these controls are equally useful in controlling other types of drive systems.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrated and not in a limiting sense.

I claim:

1. A control for a drive system including a driven shaft, a prime mover, a first electromagnetic clutch adapted to drive said shaft in one direction, a second electromagnetic clutch adapted to drive said shaft in a reverse direction, and a D. C. field coil for each of said clutches adapted to couple said prime mover to said driven shaft in response to electrical energization thereof; comprising current amplifier means for each of said coils adapted in response to a composite potential variably to energize its respective coil, a circuit connected to each of said current amplifier means including a D. C. generator, and a potentiometer having at least two positioning ranges and a constant D. C. potential source therefor, said generator being connected to said driven shaft and having a first D. C. output potential responsive in magnitude and polarity to rotational speed and direction respectively of the driven shaft, said potentiometer having a D. C. output potential responsive to the positioning thereof to produce a second D. C. potential in opposition to said first D. C. potential whereby in the first positioning range said first clutch is energized to drive said driven shaft in one direction and in the second positioning range said second clutch is energized to drive said shaft in a reverse direction.

2. A control as set forth in claim 1, wherein said current amplifiers are thyratron tubes.

3. A control as set forth in claim 1, wherein said current amplifiers are saturable reactors.

4. A control as set forth in claim 1, wherein said potentiometer has two additional positioning ranges, whereby in one of said additional positioning ranges only said first clutch is fully energized and in the other of said positioning ranges only said second clutch is fully energized.

5. A control as set forth in claim 1, wherein said prime mover has a throttle linked to said potentiometer and adapted to vary the prime-mover speed to values in excess of idling, and wherein said potentiometer has two additional positioning ranges whereby in one of said additional positioning ranges only said first clutch is fully energized and in the other of said additional positioning ranges only said second clutch is fully energized, and whereby the speed of said driven shaft is responsive to throttle adjustment in said two additional positioning ranges.

6. A control for a drive system including a driven shaft, a prime mover, a first electromagnetic clutch adapted to drive said shaft in one direction, a second electromagnetic clutch adapted to drive said shaft in a reverse direction, and a D. C. field coil for each of said clutches adapted to couple said prime mover to said driven shaft in response to electrical energization thereof; comprising a thyratron including a control grid and a cathode for each of said coils and adapted in response to a composite potential variably to energize its respective coil, and a control circuit interconnecting said grids and cathodes of said thyratrons, said control circuit including a D. C. generator and a tapped D. C. potentiometer having a rotor and a positioning range on each side of the tap, a constant D. C. potential source applied across said potentiometer, said D. C. generator being series-connected with said potentiometer tap and rotor, said D. C. generator being connected to said driven shaft and having a first D. C. output potential responsive in magnitude and polarity to the rotational speed and direction respectively of the driven shaft.

7. A control for a drive system including a driven shaft, a prime mover, a first electromagnetic clutch adapted to drive said shaft in one direction, a second electromagnetic clutch adapted to drive said shaft in a reverse direction, and a D. C. field coil for each of said clutches adapted to couple said prime mover to said driven shaft in response to electrical energization thereof; comprising a thyratron including a control grid and a cathode for each of said coils and adapted in response to a composite potential variably to energize its respective coil, and a control circuit interconnecting said grids and cathodes of said thyratrons, said control circuit including a D. C. generator and a tapped D. C. potentiometer having a rotor and a positioning range on each side of the tap, a constant D. C. potential source applied across said potentiometer, said D. C. generator being connected to said driven shaft and having two output terminals and a first D. C. output potential responsive in magnitude and polarity to the rotational speed and direction respectively of the driven shaft, said rotor being connected to the cathode of one thyratron and the grid of the other thyratron, one output terminal of said generator being connected to the remaining thyratron grid and cathode, the other output generator terminal and said potentiometer tap being interconnected.

8. A control as set forth in claim 7, wherein said potentiometer has two additional positioning ranges whereby in one of said additional positioning ranges only said first clutch is fully energized and in the other of said positioning ranges only said second clutch is fully energized.

9. A control as set forth in claim 7, wherein an A. C. rider-wave unit is series-connected in each thyratron grid-cathode circuit.

10. A control as set forth in claim 7, wherein an A. C. rider-wave unit and an additional adjustable D. C. potential are series-connected in each thyratron grid-cathode circuit.

11. A control as set forth in claim 10, wherein said prime mover has a throttle linked to said potentiometer and adapted to vary the prime-mover speed to values in excess of idling speed, and wherein said potentiometer has two additional positioning ranges whereby in one of said additional positioning ranges only said first clutch is fully energized and in the other of said additional positioning ranges only said second clutch is fully energized, and whereby the speed of said driven shaft is responsive to throttle adjustment in said two additional positioning ranges.

12. A control for a drive system including a driven shaft, a prime mover, a first electromagnetic clutch adapted to drive said shaft in one direction, a second electromagnetic clutch adapted to drive said shaft in a reverse direction, and a D. C. field coil for each of said clutches adapted to couple said prime mover to said driven shaft in response to electrical energization thereof; comprising a saturable reactor including a power and control winding for each of said field coils adapted to energize its respective coil through a rectifier in response to a composite D. C. potential applied to its control winding, a control circuit interconnecting said control windings, said control circuit including a D. C. generator and a tapped D. C. potentiometer having a rotor and having a positioning range on each side of said tap, a constant D. C. potential source applied across said potentiometer, said D. C. generator being connected to said driven shaft and having an output potential responsive in magnitude and polarity to the rotational speed and direction respectively of the driven shaft, said D. C. generator being series-connected with said potentiometer tap and said rotor.

13. A control as set forth in claim 12, wherein said potentiometer has two additional positioning ranges whereby in one of said additional positioning ranges only said first clutch is fully energized and in the other additional positioning range only said second clutch is fully energized.

14. A control for a drive system including a driven shaft, a prime mover, a first electromagnetic clutch adapted to drive said shaft in one direction, a second electromagnetic clutch adapted to drive said shaft in a reverse direction, and a D. C. field coil for each of said clutches adapted to couple said prime mover to said driven shaft in response to electrical energization thereof; comprising a saturable reactor including a power and control winding for each of said field coils adapted to energize its respective coil through a rectifier in response to a composite D. C. potential applied to its control winding, said control windings being loop-connected in series with a pair of similarly polarized rectifiers, and a control circuit connected between the junction of said rectifiers and the other side of the loop, said control circuit including a D. C. generator and a tapped D. C. potentiometer having a rotor and a positioning range on each side of said tap, a constant D. C. potential source applied across said potentiometer, said D. C. generator being connected to said driven shaft and having an output potential responsive in magnitude and polarity to the rotational speed and direction respectively of the driven shaft, said D. C. generator being series-connected with said potentiometer tap and said rotor.

15. A control as set forth in claim 14, wherein said prime mover has a throttle linked to said potentiometer and adapted to vary the prime-mover speed to values in excess of idling, and wherein said potentiometer has two additional positioning ranges whereby in one of said additional positioning ranges only said first clutch is fully energized and in the other of said additional positioning ranges only said second clutch is fully energized, and whereby the speed of said driven shaft is responsive only to throttle adjustment in said two additional positioning ranges.

No references cited.